US012763476B2

(12) United States Patent
Li

(10) Patent No.: US 12,763,476 B2

(45) Date of Patent: Oct. 13, 2026

(54) SLOT ANTENNA DEVICE

(71) Applicants: INVENTEC (PUDONG) TECHNOLOGY CORPORATION, Shanghai (CN); INVENTEC CORPORATION, Taipei City (TW)

(72) Inventor: Chih-Cheng Li, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 131 days.

(21) Appl. No.: 18/972,186

(22) Filed: Dec. 6, 2024

(65) Prior Publication Data

US 2025/0385434 A1 Dec. 18, 2025

(30) Foreign Application Priority Data

Jun. 12, 2024 (CN) ......................... 202410758223.8

(51) Int. Cl.
*H01Q 13/10* (2006.01)

(52) U.S. Cl.
CPC .................................. *H01Q 13/10* (2013.01)

(58) Field of Classification Search
CPC ..................................................... H01Q 13/10
See application file for complete search history.

(56) References Cited

U.S. PATENT DOCUMENTS 10,622,705 B2 * 4/2020 Won ..................... H01Q 1/2208
2020/0073445 A1 * 3/2020 Kuna .................... G06F 1/1626

FOREIGN PATENT DOCUMENTS

KR 20200098857 A * 8/2020 .......... H04M 1/0268
WO WO-2016126038 A1 * 8/2016 ............ H01Q 13/10

* cited by examiner

*Primary Examiner* — Seung H Lee
(74) *Attorney, Agent, or Firm* — Maschoff Brennan

(57) ABSTRACT

A slot antenna device, including: a conductive shell, having an inner surface and an outer surface facing away from each other and having a slot, penetrating through the conductive shell from the inner surface to the outer surface, and a chamfer structure, formed at an intersection of the slot and the inner surface; an inner frame, disposed on the inner surface of the conductive shell, wherein the inner frame has an overflow groove, an opening of the overflow groove faces the inner surface, and a distance from the overflow groove to the chamfer structure is ≥0 mm and ≤2.0 mm; an adhesive glue, disposed between the conductive shell and the inner frame, wherein a part of the adhesive glue is located in the overflow groove; and a circuit board, disposed on the inner frame, wherein the circuit board and the slot form an antenna radiator.

10 Claims, 1 Drawing Sheet

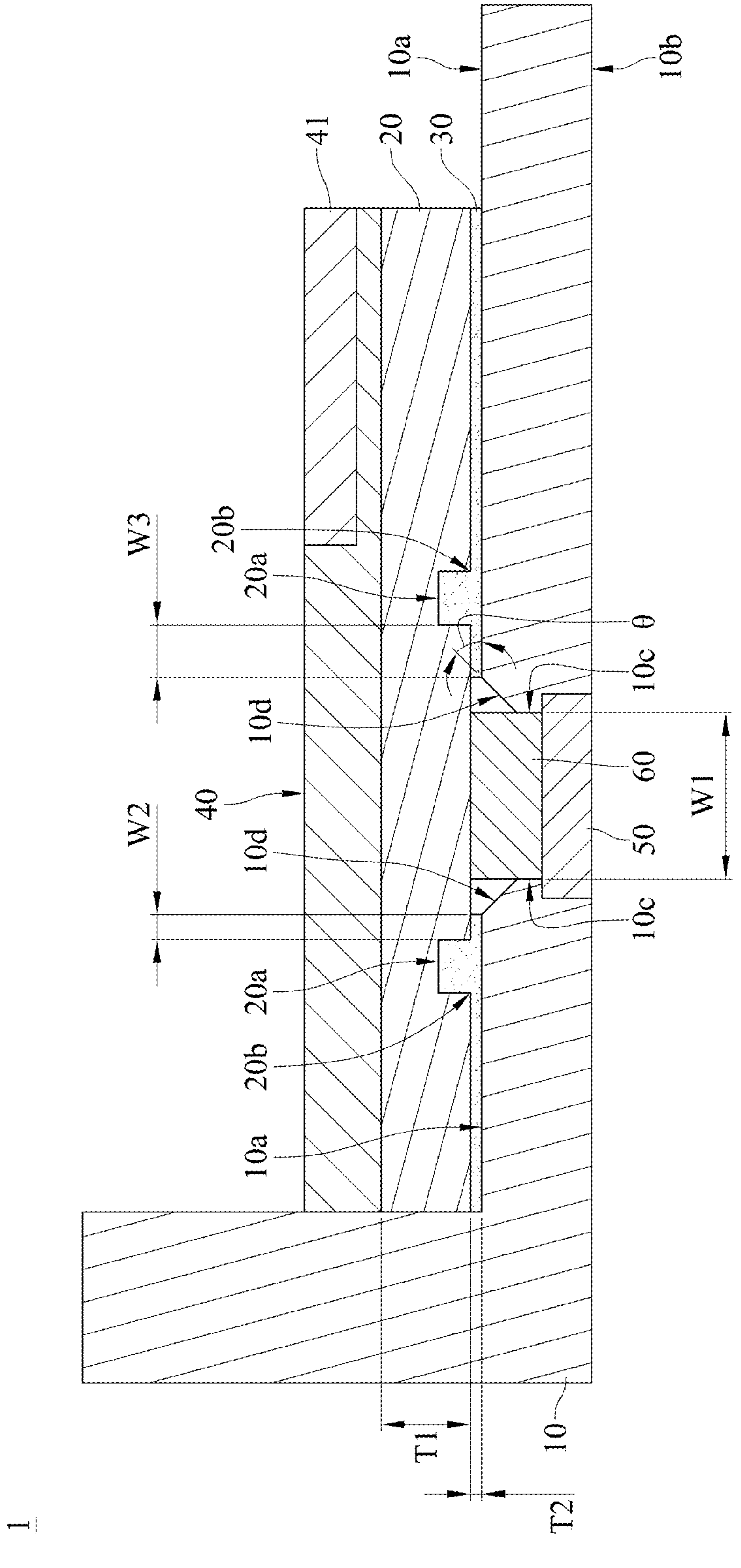
10a
10b
41
20
30
W3
20b
20a
θ
10c
10d
60
W1
40
W2
10d
50
10c
20a
20b
10a
T1
10
T2
1

SLOT ANTENNA DEVICE

This non-provisional application claims priority under 35 U.S.C. § 119(a) on Patent Application No(s). 202410758223.8 filed in China on Jun. 12, 2024, the entire contents of which are hereby incorporated by reference.

TECHNICAL FIELD

The invention relates to a slot antenna device, especially to a slot antenna device whose performance can be stably ensured.

BACKGROUND

There are many types of antennas used in electronic products today. In order to enable the signal transmission of the antenna, there should be a slot on a housing of an electronic product. The antenna designed for such slot is usually referred as a slot antenna. Also, in order to improve the appearance of the electronic product, manufacturers often narrow the slot as much as possible.

However, as the widths of the slots become narrower, a reduction of the performance of the slot antenna caused by processing defects during the formation of the slots becomes more severe.

SUMMARY

This invention is to disclose a slot antenna device whose performance can be stably ensured.

One embodiment of the invention provides a slot antenna device, including a conductive shell, an inner frame, an adhesive glue and a circuit board. The conductive shell has an inner surface and an outer surface facing away from each other, and has a slot and a chamfer structure. The slot penetrates through the conductive shell from the inner surface to the outer surface. The chamfer structure is formed at an intersection of the slot and the inner surface. The inner frame is disposed on the inner surface of the conductive shell. The inner frame has an overflow groove. An opening of the overflow groove faces the inner surface. A distance from the overflow groove to the chamfer structure is greater than or equal to 0 millimeter (mm) and less than or equal to 2.0 mm. The adhesive glue is disposed between the conductive shell and the inner frame. A part of the adhesive glue is located in the overflow groove. The circuit board is disposed on the inner frame. The circuit board and the slot form an antenna radiator.

In one embodiment of the slot antenna device of the invention, when the adhesive glue bonds the conductive shell and the inner frame to each other, a part of the adhesive glue may overflow into the overflow groove and without flowing into the slot because the overflow groove of the inner frame is disposed near the slot and the opening of the overflow groove faces the inner surface of the conductive shell. Since the chamfer structure of the conductive shell is formed at the intersection of the slot and the inner surface, burrs that may occur on the conductive shell located between the slot and the circuit board may be reliably prevented. Accordingly, unexpected situations in the physical arrangement of the slot of the antenna radiator may be avoided, thereby the performance of the slot antenna performance may be stably ensured.

The above description about the content of the invention and the following description about the embodiments are used to demonstrate and explain the spirit and principle of the invention and provide a further explanation of the scope of claims of the invention.

BRIEF DESCRIPTION OF THE DRAWINGS

The invention will become better understood from the detailed description given hereinbelow and the accompanying drawings which are given by way of illustration only and thus are not intending to limit the invention and wherein:

FIG. 1 is a schematic side cross-sectional view of a slot antenna device according to one embodiment of the invention.

DETAILED DESCRIPTION

Features and advantages of embodiments of the invention are described in the following detailed description, it allows the person skilled in the art to understand the technical contents of the embodiments of the invention and implement them, and the person skilled in the art can easily comprehend the purposes of the advantages of the invention. The following embodiments are further illustrating the perspective of the invention, but not intending to limit the invention.

The drawings may not be drawn to actual size or scale, some exaggerations may be necessary in order to emphasize basic structural relationships, while some are simplified for clarity of understanding, but the invention is not limited thereto. It is allowed to have various adjustments under the spirit of the invention. In addition, the spatially relative terms, such as "up", "top", "above", "down", "low", "left", "right", "front", "rear", and "back" and the like, may be used herein for ease of description to describe the relationship of one element or feature to another element(s) of feature(s) as illustrated in the drawings. It will be understood that the spatially relative terms are intended to encompass orientations of the element or feature but not intended to limit the invention.

Please refer to FIG. 1. FIG. 1 is a schematic side cross-sectional view of a slot antenna device 1 according to one embodiment of the invention.

As shown in FIG. 1, the slot antenna device 1 includes a conductive shell 10, an inner frame 20, an adhesive glue 30 and a circuit board 40.

In this embodiment, the conductive shell 10 has an inner surface **10*a* and an outer surface 10*b*, and has a slot 10*c* and a chamfer structure 10*d*. The inner surface 10*a* and the outer surface 10*b* face away from each other. The slot 10*c* penetrates through the conductive shell 10 from the inner surface 10*a* to the outer surface 10*b*. The chamfer structure 10*d* is formed at an intersection of the slot 10*c* and the inner surface 10*a*. The slot 10*c* is a through hole with a width and a length different from each other. The width of the slot 10*c* is usually a minimum width W1. In this embodiment, the minimum width W1 of the slot 10*c* is 1 mm±10%, but the invention is not limited thereto. In other embodiments, the minimum width W1 of the slot 10*c*** may also be greater than 1 mm.

In this embodiment, the chamfer structure **10*d* has a plane. An angle θ between the chamfer structure 10*d* and the inner surface 10*a*** is greater than or equal to 45° and less than or equal to 70°, but the invention is not limited thereto. In other embodiments, the chamfer structure may also have a rounded surface, and in this time, the chamfer structure may also be called a fillet.

In this embodiment, the inner frame 20 is disposed on the inner surface **10*a* of the conductive shell 10**. The inner frame 20 has an overflow groove 20*a*. An opening 20*b* of the overflow groove 20*a* faces the inner surface 10*a*. A thickness T1 of the inner frame 20 in a vertical direction in FIG. 1 is greater than or equal to 0.6 mm and less than or equal to 0.7 mm.

In this embodiment, the overflow groove 20*a* surrounds the slot 10*c* in a horizontal direction in FIG. 1. In the cross-sectional view of FIG. 1, a cross-section of the overflow groove 20*a* is located on left and right sides of a cross-section of the slot 10*c*. A distance W2 from the overflow groove 20*a* to the left side of the chamfer structure 10*d* and a distance W3 from the overflow groove 20*a* to the right side of the chamfer structure 10*d* are respectively greater than or equal to 0 mm and less than or equal to 2.0 mm, but the invention is not limited thereto. In other embodiments, the distances in all directions (each side) from the overflow groove 20*a* to the chamfer structure 10*d* may be the same. In other embodiments, the overflow groove 20*a* may be disposed on only one side or a plurality of sides of the slot 10*c*. In an embodiment where the overflow groove 20*a* is disposed on the plurality of sides of the slot 10*c*, the distances in all directions from the overflow groove 20*a* to the chamfer structure 10*d* may be the same or different from each other.

In this embodiment, the inner frame 20 is made of an insulating material, but the invention is not limited thereto. In other embodiments, the inner frame 20 may also be made of a metal or a non-metal conductive material.

The adhesive glue 30 is disposed between the conductive shell 10 and the inner frame 20. A part of the adhesive glue 30 is located in the overflow groove 20*a* of the inner frame 20. The adhesive glue 30 has a thickness T2 in the vertical direction in FIG. 1, and the thickness T2 is nearly zero. When the adhesive glue 30 bonds the conductive shell 10 and the inner frame 20 to each other, a part of the adhesive glue 30 may overflow into the overflow groove 20*a*, and the adhesive glue 30 is prevented from flowing into the slot 10*c* of the conductive shell 10 because the overflow groove 20*a* of the inner frame 20 is disposed near the slot 10*c* of the conductive shell 10 and the opening 20*b* of the overflow groove 20*a* faces the inner surface 10*a* of the conductive shell 10. Accordingly, unexpected situations in the physical arrangement of the slot 10*c* of an antenna radiator may be avoided, thereby the performance of the slot antenna performance may be stably ensured. For example, the adhesive glue 30 is prevented from overflowing to the slot 10*c* and thus the signal transmitted from or received by the slot antenna device 1 is prevented from passing through the adhesive glue 30 instead of the air in the slot 10*c*.

The circuit board 40 is disposed on the inner frame 20. The circuit board 40 has a ground component 41. The circuit board 40 and the slot 10*c* form the antenna radiator. A distance between the ground component 41 of the circuit board 40 and the slot 10*c* in the vertical direction in FIG. 1 is a sum of the thickness T1 of the inner frame 20 and the thickness T2 of the adhesive glue 30. Since the thickness T2 of the adhesive glue 30 is nearly zero, the distance between the ground component 41 and the slot 10*c* in the vertical direction in FIG. 1 may mainly be maintained by the thickness T1 of the inner frame 20. Since the chamfer structure 10*d* of the conductive shell 10 is formed at an intersection of the slot 10*c* and the inner surface 10*a*, burrs that may occur on the conductive shell 10 located between the slot 10*c* and the circuit board 40 may be reliably prevented. Accordingly, unexpected situations in the physical arrangement of the slot 10*c* of the antenna radiator may be avoided, thereby the performance of the slot antenna performance may be stably ensured.

In addition, in this embodiment, the slot antenna device 1 may also further include a film 50 and a supporting component 60. The film 50 is disposed on the conductive shell 10 and seals the slot 10*c*. The outer surface 10*b* of the conductive shell 10 is located closer to the film 50 than the inner surface 10*a*. The supporting component 60 is disposed in the slot 10*c* and in contact with the inner frame 20 and the film 50. In this embodiment, a cross-section of the supporting component 60 is in a rectangular shape. The conductive shell 10, the inner frame 20 and the supporting component 60 form a space with a roughly triangular cross-section at a position of the chamfer structure 10*d*, but the invention is not limited thereto. In other embodiments, the supporting component 60 may further fill the space with the roughly triangular cross-section located at the chamfer structure 10*d* (filling the chamfer structure 10*d*).

In other embodiments, the slot antenna device 1 may also further include a supporting component 60 but may not inlcude the film 50. The supporting component 60 may be disposed in the slot 10*c* of the conductive shell 10 and completely fill the slot 10*c* and the chamfer structure 10*d*.

When the slot antenna device 1 is assembled, the performance of the slot antenna device 1 may be confirmed by measuring the Voltage Standing Wave Ratio (VSWR) of the slot antenna device 1.

As discussed above, in one embodiment of slot antenna device of the invention, when the adhesive glue bonds the conductive shell and the inner frame to each other, a part of the adhesive glue may overflow into the overflow groove and without flowing into the slot because the overflow groove of the inner frame is disposed near the slot and the opening of the overflow groove faces the inner surface of the conductive shell. Since the chamfer structure of the conductive shell is formed at the intersection of the slot and the inner surface, burrs that may occur on the conductive shell located between the slot and the circuit board may be reliably prevented. Accordingly, unexpected situations in the physical arrangement of the slot of the antenna radiator may be avoided, thereby the performance of the slot antenna performance may be stably ensured.

Although the invention is disclosed in the foregoing embodiments, it is not intended to limit the invention. All variations and modifications made without departing from the spirit and scope of the invention fall within the scope of the invention. For the scope defined by the invention, please refer to the attached claims.

What is claimed is:

1. A slot antenna device, comprising:

a conductive shell, having an inner surface and an outer surface facing away from each other and having a slot and a chamfer structure, wherein the slot penetrates through the conductive shell from the inner surface to the outer surface, and the chamfer structure is formed at an intersection of the slot and the inner surface;

an inner frame, disposed on the inner surface of the conductive shell, wherein the inner frame has an overflow groove, an opening of the overflow groove faces the inner surface, and a distance from the overflow groove to the chamfer structure is greater than or equal to 0 mm and less than or equal to 2.0 mm;

an adhesive glue, disposed between the conductive shell and the inner frame, wherein a part of the adhesive glue is located in the overflow groove; and a circuit board, disposed on the inner frame, wherein the circuit board and the slot form an antenna radiator.

2. The slot antenna device according to claim 1, wherein the overflow groove surrounds the slot.

3. The slot antenna device according to claim 1, wherein a width of the slot is 1 mm±10%.

4. The slot antenna device according to claim 1, wherein the chamfer structure has a plane or a rounded surface.

5. The slot antenna device according to claim 4, wherein an angle between the chamfer structure and the inner surface is greater than or equal to 45° and less than or equal to 70°.

6. The slot antenna device according to claim 1, further comprising a film disposed on the conductive shell and sealing the slot, wherein the outer surface is located closer to the film than the inner surface.

7. The slot antenna device according to claim 6, further comprising a supporting component disposed in the slot and in contact with the inner frame and the film.

8. The slot antenna device according to claim 1, further comprising a supporting component disposed in the slot and filling the chamfer structure.

9. The slot antenna device according to claim 1, wherein a thickness of the inner frame is greater than or equal to 0.6 mm and less than or equal to 0.7 mm.

10. The slot antenna device according to claim 1, wherein the inner frame is made of a metal or a plastic.

* * * * *